INVENTOR.
Zoltan Tarczy-Hornoch
BY Fleh, Swain
Attorneys

INVENTOR.
Zoltan Tarczy-Hornoch
BY Fleit & Swain
Attorneys

INVENTOR.
Zoltan Tarczy-Hornoch
BY Fleher & Swain
Attorneys

United States Patent Office 3,444,462

Patented May 13, 1969

3,444,462

LOGIC NETWORK AND METHOD FOR USE IN INTERPOLATING TIME INTERVAL COUNTERS

Zoltan Tarczy-Hornoch, Berkeley, Calif., assignor to W. K. Rosenberry, doing business as Zeta Research, Lafayette, Calif.

Filed June 25, 1964, Ser. No. 377,971
Int. Cl. G01r *11/00;* G11c *15/00;* H03k *13/04*
U.S. Cl. 324—68 14 Claims

ABSTRACT OF THE DISCLOSURE

Logic network and method for determining the magnitude of a physical quantity in coarse and fine quanta in which the number of coarse quanta is determined and stored within a possible error of one count, information is stored representing the possibility of the one count error in the stored number of coarse quanta, the number of fine quanta is determined and stored, and in which the stored information representing the possible error in the number of coarse quanta and the stored number of the fine quanta are correlated to generate a signal for causing, if necessary, a correction of the stored number of coarse quanta.

This invention relates to a logic network and method and particularly to a logic network and method for use in interpolating or vernier time interval counters.

Vernier digital time interval measuring systems have heretofore been disclosed as for example on pages 508–514 in paragraph 16–10 of Millman and Taub Pulse and Digital Circuits published by McGraw-Hill Book Company, Inc., New York in 1956. There are however many difficulties with such a system as hereinafter explained. There is therefore a need for a new and improved logic network and method for use in an interpolating time interval counter.

In general, it is an object of the present invention to provide a logic network and a method for use in interpolating time interval counters which overcomes the disadvantages of presently known systems and methods.

Another object of the invention is to provide a logic network and method of the above character which eliminates the ±1 count error associated with interpolating or vernier time interval counters.

Another object of the invention is to provide a logic network and method which can be used with interpolating time interval counters having phase locked reference oscillators.

Another object of the invention is to provide a logic network and method which can be used with interpolating time interval counters having nonphase locked oscillators.

Another object of the invention is to provide a logic network and method which is relatively simple and straight-forward.

Additional objects and features of the invention will appear from the following description in which the preferred embodiment is set forth in detail in conjunction with the accompanying drawings.

Referring to the drawings.

As explained above, there is a vernier digital time interval measuring system and apparatus disclosed by Millman and Taub in paragraph 16–10. In copending application Serial No. 377,972, filed June 25, 1964, there is disclosed an interpolating time interval counter which also can be utilized for measuring time intervals. In order to present the problem which is encountered in making time interval measurements with such apparatus, let it be assumed that it is desired to measure a total time interval of $$T=N_1\tau_1+N_2\tau_2 \qquad (1)$$

where

T is the total time interval or quantity to be measured,
$\tau_1$ is a coarse quantum or time unit,
$\tau_2$ is a vernier quantum or time unit and equals $\tau_1\alpha^{-k}$,
$N_1$ is a positive, integer,
$N_2$ is a positive integer,
$\alpha$ is a positive integer and preferably equal to 10,
$k$ is a positive integer.

The first step in measuring the total time interval is to measure $N_1\tau_1$ by determining $$N_1\tau_1<T<(N_1+1)\tau_1 \qquad (2)$$

This can be accomplished by counting the clock frequency $f_1$ for a duration of T where $$f_1=\frac{1}{\tau_1} \qquad (3)$$

Figure 1:
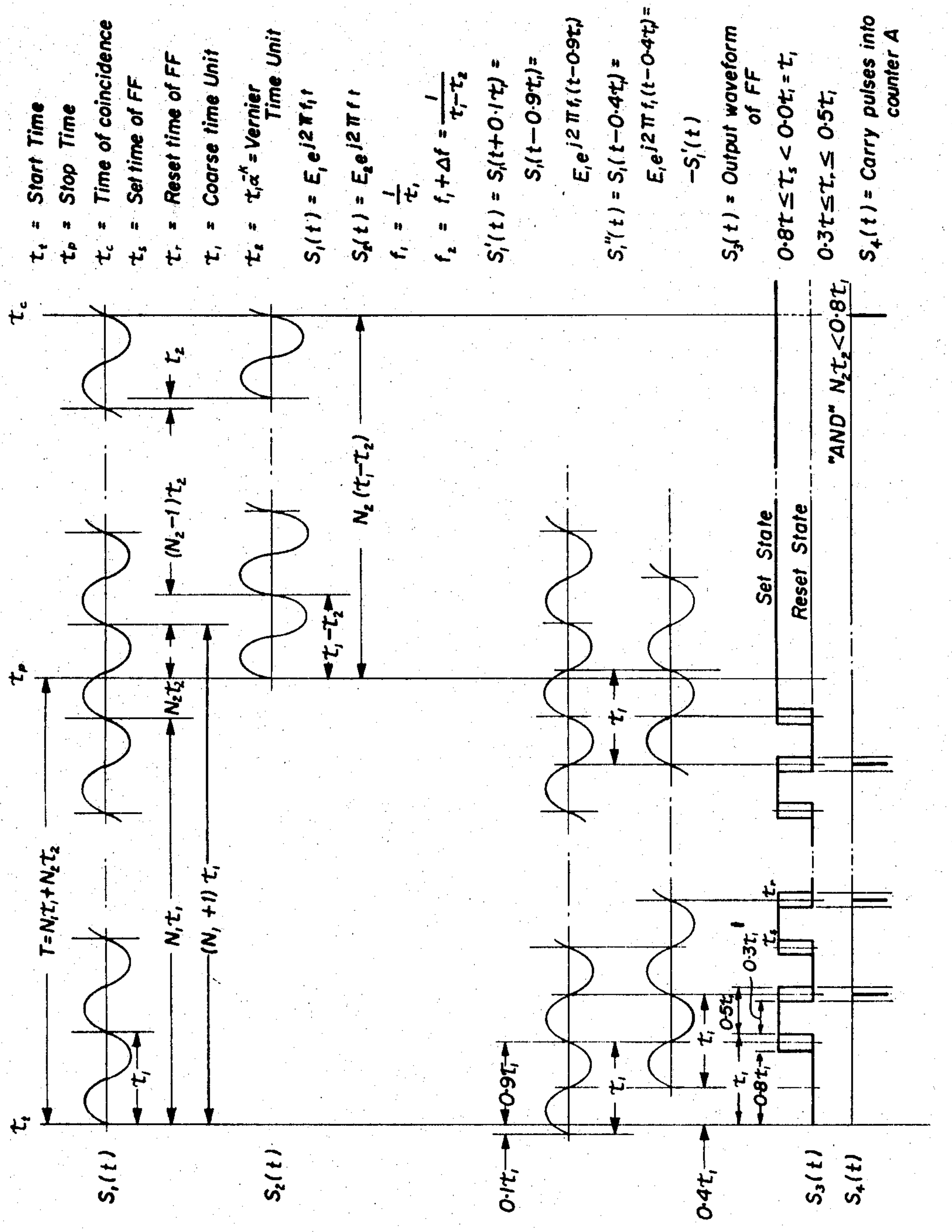
FIGURE 1 is a chart which shows the different waveforms generated in making interpolating time interval measurements.

Let it be assumed that this clock frequency $f_1$ is counted by a suitable main or coarse counter A which will accumulate $N_1$ counts. The counter A can be arranged in a suitable manner such as in a decimal scale, but, if desired, can be counted in any scale identified as the scale of $\alpha$. Let it be assumed that the interpolation time interval counter is constructed in such a manner that the zero phase of the clock signal $S_1=E_1e^{j2\pi f_1t}$, from a first clock generator which produces the clock frequency $f_1$, will always be in synchronism with the start time $\tau_t$ starting the time interval T to be measured as shown in FIGURE 1. One such generator is described in copending application Ser. No. 377,825, filed June 25, 1964. As stated therein, the first clock generator can be identified as being "phase locked." Let it also be assumed that the counter A advances at or around the time of the zero phase of the clock signal $S_1$ and that the initial zero phase at the start of the time interval T is not counted.

The next step in determining the time interval T is to determine $N_2$. One possible way is to generate a second clock signal $S_2=E_2e^{j2\pi f_2t}$ from a second clock generator which produces the clock frequency $f_2$ phase locked to a stop signal that indicates the end of the time interval T to be measured.

If it is assumed that $$f_2=f_1+\Delta f=\frac{1}{\tau_1-\tau_2} \qquad (4)$$

then the initial phase difference of $N_2\tau_2$ between $S_1$ and $S_2$ will be reduced to $(N_2-1)\tau_2$ after one $\tau_1-\tau_2$ period, etc. until after $N_2({}_1-\tau_2)$ periods, the phase difference will become zero, and the zero phase points of $S_1$ and $S_2$ will be in coincidence as shown in FIGURE 1. An interpolating or vernier counter B, which preferably uses the decimal scale but can use any scale such as the scale of $\alpha$, is enabled to count the second clock frequency $f_2$ from the time of termination $\tau_p$ of the time interval T until the time of coincidence $\tau_c$. The counter B will accumulate $N_2$ counts assuming again that the first zero phase (at $\tau_p$) is not counted and the last one (at $\tau_c$) is counted.

From the foregoing, it can be seen that the digital measurement for the time interval $T=N_1\tau_1+N_2\tau_2$ is accomplished with a resolution of $\tau_2$ by using counting circuitry with essentially $\alpha^k$ times slower resolution. The numerical readout provided by the counters A and B gives an appropriate display of the integers $N_1$ and $N_2$ and requires no additional information and no other arithmetic operation.

An interpolation time interval counter constructed as set forth above will give a correct reading for all situations except for the situation where the time interval T closely equals $N_1\tau_1$, or, in other words, when the end of the time interval T is very close to the zero phase of the clock signal S1. Since the main counter A does not necessarily advance at zero phase and certainly not with $\tau_2$ or better resolution, it is possible for the counter to count $N_1-1$ or $N_1+1$ depending upon whether the time interval T is just over or just under $N_1\tau_1$, respectively, or, in other words, the zero phase of the signal S1 is just after or just before the end of the time interval T. Thus, it is not possible to tell instantaneously whether the counter A did or did not count the last count which might be needed or surplus at the time that the counter A was gated off, and, therefore, a $\pm 1$ main count ambiguity is presented.

The range of critical stop time in which ambiguity can occur, as pointed out above, can be minimized by designing circuits having better resolution and faster rise time but no matter how much the circuit is improved, the ambiguity cannot be eliminated.

The present invention, therefore, relates to a logic network and method which solves this ambiguity problem and which is particularly adapted to work in connection with interpolating time interval counters disclosed in copending application Ser. No. 377,972, filed June 25, 1964, concurrently herewith.

The new method can be best described with reference to the lower part of FIGURE 1. Let it be assumed that in addition to the clock signal S1 two additional clock signals S1′ and S1″ are provided. S1′ is advanced and the S1″ is delayed in time (or phase) with respect to the clock signal S1. For example, S1′ can be advanced in time by 0.1 $\tau_1$ and S1″ can be delayed in time by 0.4 $\tau_1$. The figures 0.1 and 0.4 are somewhat arbitrary and are chosen for purposes of illustration only. For example 0.1 $\tau_1$ means that the shift utilized is relatively small in comparison to the interval $\tau_1$, and 0.4 $\tau_1$ means that S1′ and S1″ are approximately opposite in phase.

The provision of means for generating such clock signals such as S1, S1′ and S1″ is well known to those skilled in the art. For example, it can be accomplished by utilizing appropriate active or passive phase shifting or delay networks. To generate S1′ instead of 0.1 $\tau_1$ advance 0.9 $\tau_1$ delay can be utilized or alternatively S1′ can be obtained from S1″ by phase inversion. These relationships are shown graphically and mathematically expressed in FIGURE 1.

With the logic method herein disclosed, signals S1′ and S1″ enabled during time interval T are fed into a temporary storage device. This can be accomplished by having the zero phase of the clock signal S1′ trigger a bistable device with set and reset stable states such as a flip flop or a tunnel diode into its set condition at a time which can be identified as $\tau_s$. The output of the bistable device shown as S3(*t*) in FIGURE 1 is connected to the main counter A in such a way that the main counter A is advanced every time the bistable device hereinafter called FF is reset at time $\tau_r$ by the zero phase of the clock signal S1″. The carry signals are shown in FIGURE 1 as S4(*t*).

As hereinafter explained, in order to make possible the use of circuitry and gating having relatively low resolution and relatively inaccurate timing, the time periods during which $\tau_s$ and $\tau_r$ can occur are relatively large as indicated by the bands in waveform S3 in FIGURE 1. Thus, for example, assuming that the clock signal S1′ has a time advance of 0.1 $\tau_1$ and that the clock signal S1″ has a time lag of 0.4 $\tau_1$ with respect to the clock signal S1, it can be stated that $$0.8\tau_1 \leq \tau_s < \tau_1$$

and $$0.3\tau_1 \leq \tau_r \leq 0.5\tau_1$$

It should be noted that the permitted time ambiguity of $\tau_s$ and $\tau_r$, assumed to be $\pm 0.1\tau_1$ in the above example, may represent a composite error due to inaccuracies in signals S1, S1′, S1″ and all the associated delay, gating, coupling, inverting etc. circuitry.

TABLE I

| Relative stop time $\tau_p$ | Possible flip-flop FF conditions | Count addition needed | $C_1 x C_2 x C_3$ |
|---|---|---|---|
| $0.0\tau_p < 0.3\tau_1$ | S | 1 | 1 |
| $0.3\tau_1 \geq \tau_p \geq 0.5\tau_1$: | | | |
| $\tau_p < \tau_r$ | S | 1 | 1 |
| $\tau_p > \tau_r$ | R | 0 | 0 |
| $0.5\tau_1 < \tau_p < 0.8\tau_1$ | R | 0 | 0 |
| $0.8\tau_1 \geq \tau_p < 0.0\tau_1$: | | | |
| $\tau_p < \tau_s$ | R | 0 | 0 |
| $\tau_p > \tau_s$ | S | 0 | 0 |

The first column of Table I gives all the possible stopping times $\tau_p$ for the termination of the time interval T. As can be appreciated, the intervals shown in the first column of Table I are directly related to the phase advance and phase lag of the clock signals S1′ and S1″. From the intervals shown in the first column of Table I, it can be seen again that the set and reset times $\tau_s$ and $\tau_t$ need not be very precise.

With the present method, it can be seen from Table I above that main counter A never has more than the correct number of counts but under certain conditions may have one less than the correct number of counts. This is the condition when the stop pulse arrives at a time after the relative time $0.0\tau_1$ (time when a carry pulse should occur) but before $\tau_r$ (the time when the actual carry pulse is fed into main counter A). This delaying of the carry time is purposely introduced to allow sufficient time to determine whether or not the carry pulse should be utilized. Thus, information is stored in the flip flop FF until it is absolutely positive that enough time has elapsed to know that an extra count *is* needed for the main counter. It is for this reason that between $0.8\tau_1$ and $\tau_1$ of the total time is allowed for the set time $\tau_s$, and between $0.3\tau_1$ and $0.5\tau_1$ of the total time is allowed for the reset time $\tau_r$. Thus, any stop signal coming in at $\tau_p$ after the $0.5\tau_1$ point will find that the correct number of counts have been accumulated in the main counter A. A stop signal coming in between $0.3\tau_1$ and $0.5\tau_1$ might or might not give the correct count to the main counter A, but this can be easily corrected. Any stop signal coming between $0.0\tau_1$ and $0.3\tau_1$ will be short by one count and, therefore, an additional correcting count will have to be added to the main counter A. Any stop signal coming between $0.8\tau_1$ and $\tau_1$ does not require a correcting count for the main counter A. This is clearly summarized in Table I set forth above, and can also be followed on FIGURE 1 by assuming that $\tau_p$ shifts through a period of $\tau_1$. Table I shows the conditions where a count correction is needed for the main counter A, namely, every time the flip flop FF stops in the set state S, except if $\tau_p$ satisfies the equation $$0.8\tau_1 \leq \tau_p < 0.0\tau_1$$

that is, the logical AND of S and $0.0\tau \leq \tau_p < 0.8\tau_1$. It can be easily verified that this is the equivalent of interpolating counter B later stopping on a number $N_2$ such that $N_2\tau_2 < 0.8\tau_1$ (condition $C_1$), and flip flop FF is in a set state S (condition $C_2$) at the time of coincidence $\tau_c$ (condition $C_3$). The logical product of these three conditions $C_1$, $C_2$ and $C_3$ is shown in the last column in Table I.

If the output of a circuit realizing this "AND" condition is fed into the coarse counter A, the readout will always be correct regardless of temporary errors due to shifts in timing of $\tau_s$ and $\tau_r$. In particular, it should be noted that the relative time relationship between two events $\tau_p$ and zero phase of $S_1$ is determined retroactively. The correction, if needed, comes at $\tau_c$, a relatively long time after counter A has first stopped. For this reason, the hereinbefore described method can be called a retroactive error correcting or time relationship determining method. However, it should be noted that if stop time $\tau_p$ occurs within $0.5\tau_1$ period after start time $\tau_t$, flip-flop FF will be in the reset state in contrast to the first two lines of Table I. This is true, since the first set time comes after $0.8\tau_1$ as shown in FIGURE 1. Under this condition, count addition will not be needed, but the triple AND condition $C_1 \times C_2 \times C_3$ and therefore the correcting count will not be present either, since $C_2$ requires FF being set.

Besides a triple AND circuit FIGURE 1 suggests an alternate generation for the count correcting pulse of $S_4(t)$. If a two-input AND gate senses conditions $C_1$ and $C_3$, the output can be utilized to reset FF, shown as the reset state line of $S_3(t)$, which in turn will generate a correcting count. The two methods are logically equivalent.

Figure 2:
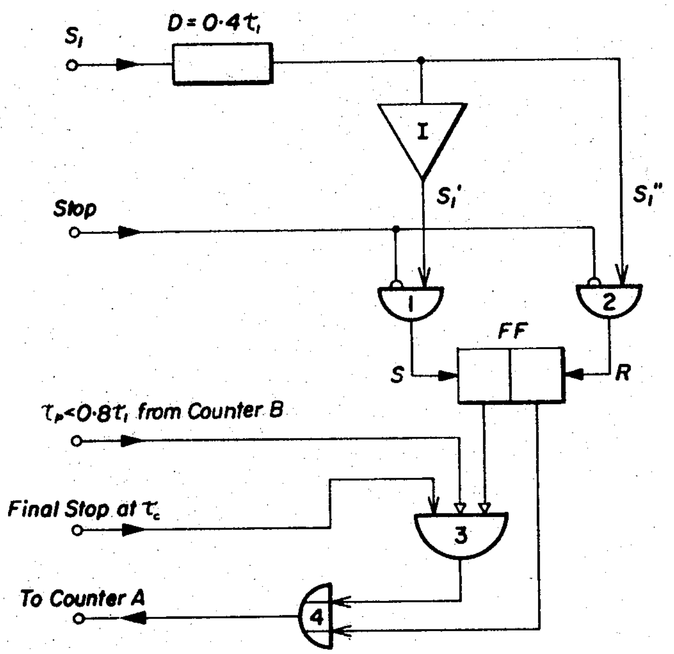
FIGURE 2 is a simplified block diagram of an interpolating logic network incorporating the present invention.

A block diagram of a logic network suitable for performing the method hereinbefore described is shown in FIGURE 2. An alternate block diagram operating in connection with a complete interpolating time interval counter described in detail in copending application Ser. No. 377,972, filed June 25, 1964, is shown in the broken line rectangle 14 in FIGURE 3.

The signals, S1, S1′ and S1″ in FIGURE 2 assumed to have the time relationship to the start time specified in FIGURE 1. FIGURE 2 also demonstrates one possible means for generating S1′ and S1″ from S1 by delay line D and inverter I. Inhibit gates 1 and 2 are enabled during time interval T, therefore flip-flop FF sets and resets periodically at times $\tau_s$ and $\tau_r$ and transmits a carry pulse through OR gate 4 into main counter A in agreement with the method hereinbefore described.

A stop pulse assumed to be a stop function at time $\tau_p$ disable gates 1 and 2 and stops flip-flop FF in one of its two stable states according to Table I. This stops the carry pulses into counter A except one more pulse will be fed from gate 3 through gate 4 into counter A if AND gate 3 is enable at time of coincidence $\tau_c$. Gate 3 will have an output if and only if conditions $C_1$, $C_2$ and $C_3$ are simultaneously present as hereinbefore specified. This is the condition when the stop pulse arrives at a time after the relative time $0.0\tau_1$ but before reset time $\tau_r$ as indicated on the first two lines of Table I. In all other conditions an additional carry pulse is neither needed nor generated. It should be noted, that a signal from counter B indicating that $N_2\tau_2 = 0.8\tau_1$, the condition $C_1$, can easily be derived from the number of counts accumulated by counter B. If, for example, counter B consists of two binary coded decimal counting units, condition $C_1$ is equivalent of the fourth flip-flop of the second counting unit being in the reset state at time $\tau_c$. This is the same as saying that the accumulated count is not in excess of 80, written as $\overline{80}$, can be any number 79 or less.

Figure 3:
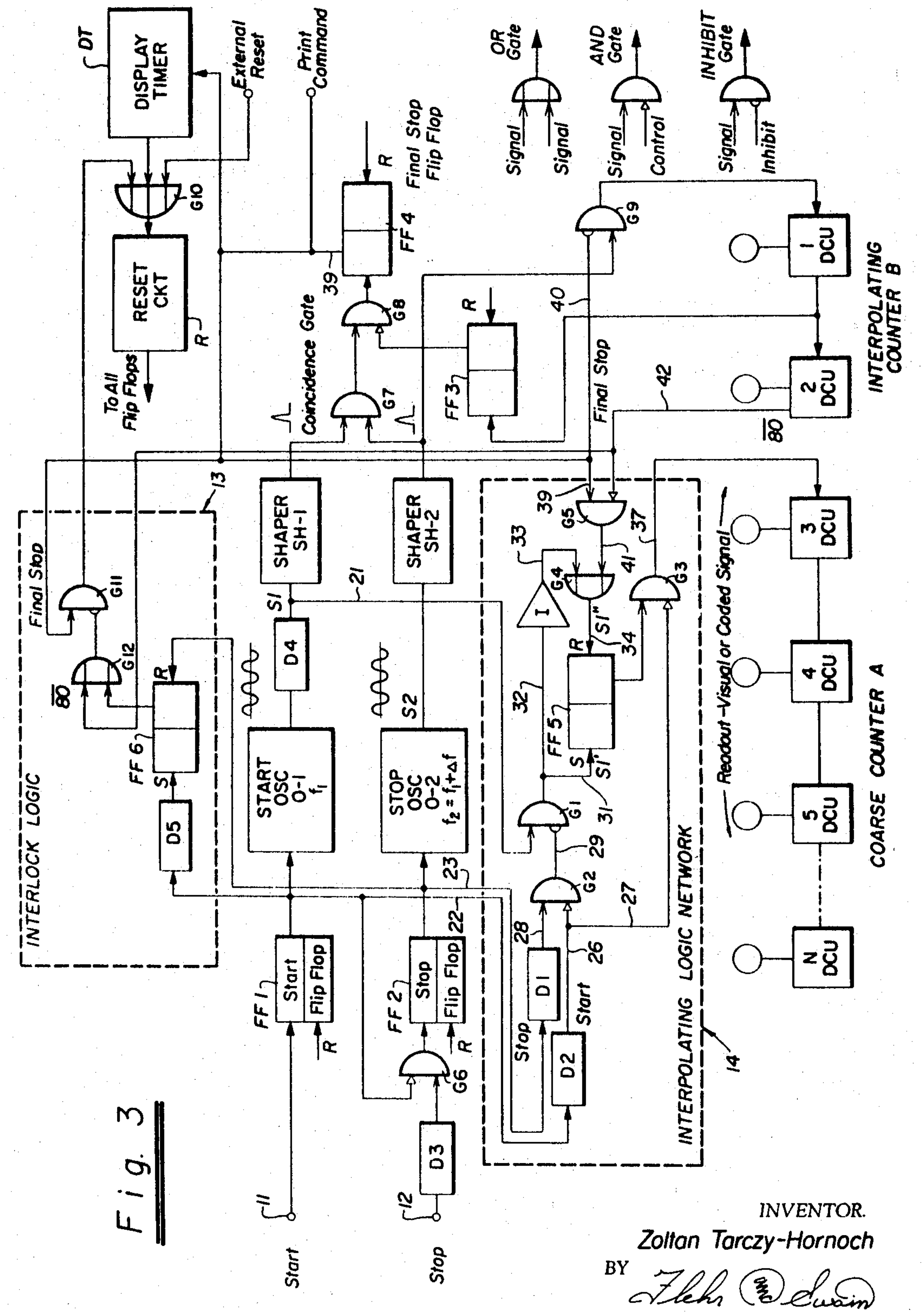
FIGURE 3 is a block diagram of another embodiment of a logic network incorporating the present invention used in conjunction with an interpolating time interval counter.

A block diagram of an alternate logic network suitable for performing the method hereinbefore described is shown incorporated in an interpolating time interval counter on FIGURE 3.

As described in copending application Serial No. 377,972, filed June 25, 1964, the start command is supplied to an input terminal 11 of the interpolating time interval counter to a start flip-flop FF1 which supplies a start signal to a start oscillator 0–1. The start oscillator 0–1 is phase locked to the start signal and produces a clock signal S1 with a clock frequency of $f_1$. The signal S1 is supplied through a delay D4 to a conductor 21 which is connected to the logic network 14. The signal S1 is also supplied to a shaper SH1 which has its output supplied to the coincidence gate G7.

The stop command is supplied to an input terminal 12 through a delay D3, through a gate G6 to the stop flip-flop FF2, which applies a start signal to the stop oscillator 0–2 that produces a clock signal S2 with a clock frequency of $f_2$ phase locked to the stop command. The output of the generator 0–2 is supplied to a shaper SH2 and the output of the shaper SH2 is supplied to the coincidence gate G7.

The output of the start flip-flop FF1 is connected to the logic network 14 by a conductor 22 and the output of the stop flip-flop FF2 is also connected to the logic network 14 by a conductor 23. The conductor 22 is connected to a delay D2 and the output of the delay D2 is connected to AND gate G2 by a conductor 26. The conductor 26 is also connected to the control terminal of an AND gate G3 by conductor 27. The conductor 23 is connected to a delay D1 which has its output connected to an input terminal of the gate G2 by a conductor 28. The output of the gate G2 is connected to the inhibit terminal of an inhibit gate G1 by a conductor 29. The conductor 21 is connected to the other input of the gate G1. The output of the gate G1 is connected to the set side of the flip-flop FF5 by a conductor 31. The conductor 31 is also connected to the inputo f an inverter I by a conductor 32. The output of the inverter is connected to one input of an OR gate G4 by a conductor 33. The output of the OR gate is connected to the reset side of the flip-flop FF5 by a conductor 34. The output terminal of the flip-flop FF5 is connected to one input of the AND gate G3 by conductor 36. The output of the gate G3 is connected to the main counter A by conductor 37.

As explained in copending application Serial No. 377,972, filed June 25, 1964, the interpolating time interval counter is provided with a final stop flip-flop FF4. The set of this final stop flip-flop FF4 supplies a final stop signal on a conductor 39 which is connected to one input of the gate G5 and which is connected to the inhibit terminal of gate G9 by conductor 40. The output of the gate G5 is connected to the other input of the OR gate G4 by a conductor 41. The $\overline{80}$ input of the interpolating counter B is supplied on a line 42 to the other input of the gate G5. The $\overline{80}$ input of the interpolating counter B as explained in copending application Ser. No. 377,972, filed June 25, 1964, is obtained from the second of two binary coded decimal counting units and means that $N_2\tau_2 < 0.8\tau_1$. This condition is present when the fourth flip-flop of the second decimal counting unit is in its reset condition.

Operation of the logic network 14 shown in FIGURE 3 in conjunction with the interpolating time interval counter also shown in FIGURE 3 may now be briefly described as follows. The delayed start oscillator signal S1 which is on the line 21 is supplied to the input of the inhibit gate G1. The inhibit gate G1 is enabled until a signal is supplied to the inhibit terminal by the output from the gate G2. Since AND gate G2 will have an output only after a start pulse followed by a stop pulse, G1 will be inhibited essentially at stop time except for the minor delaying effects of D1 and D2.

Assuming that the gate G1 is enabled, the signal S1 is supplied directly to the set side of the flip-flop FF5 and through the inverter I and also through the OR gate G4 to the reset side of the flip-flops FF5. The signals which are supplied to the set and reset sides of the FF5 can be identified as the two additional clock signals S1′ and S1″ as hereinbefore defined which are derived from the clock signal S1. Flip-flops FF5 will be periodically set and reset by S′ and S″ respectively and the output of FF5 will feed carry pulses through G3 to the main counter A. Thus, it can be seen by comparison that G1 and G2 gates together are performing the same logic function as gates 1 and 2 in FIGURE 2, that is, to feed S1′ and S1″ until stop time to the two sides of FF5 and FF respectively, which are also performing the identical temporary storage function. Inverter I in both figures serves the same phase inverting purpose, except that in FIGURE 2 precedes, and in FIGURE 3 follows inhibiting gates 1, 2 and G1 respectively.

As explained in copending application Ser. No. 377,972, filed June 25, 1964 after receipt of the stop signal, the stop oscillator 0–2 on FIGURE 3 produces the signal S2 which is supplied through the shaper SH2 to the coincidence gate G7 and also to inhibit gate G9. Since the inhibit gate G9 is initially enabled the signal S2 is supplied to the decimal counting units of the interpolating counter B which will continue counting the cycles of the signal S2 until coincidence is found between the signals S1 and S2. Upon finding coincidence, the coincidence gate G7 supplies a signal to the gate G8. Gate G8 if enabled supplies a signal to the final stop flip-flop FF4 which causes it to be triggered from its reset to its set state to supply a signal on its final stop line 39 through conductor 40 to inhibit the gate G9 to prevent the interpolating counter B from counting and additional S2 cycles. This signal is also supplied to one input of the gate G5.

The interpolating logic network 14 is now ready to make a decision as to whether or not an extra count should be added to the main counter A. As explained in connection with Table I and FIGURE 2, the gating for the logic network 14 must be such that a triple AND condition $C_1 \times C_2 \times C_3$ must be satisfied before a count is added to the main counter A. In FIGURE 3, a double AND gate G5 has been used in place of a triple AND gate because it is not necessary to feed condition C2 into a gate. This is true since, if the flip-flop FF5 is already in a reset condition, the supplying of a pulse to the reset side of the flip-flop FF5 will have no effect. On the other hand, if FF5 is in a set condition and G5 has an output through OR gate G4, FF5 will reset and through G3 add a count to main counter A.

Thus it can be seen that FF and gates 3 and 4 of FIGURE 2 and G4, G5 and FF5 of FIGURE 3 are performing the same functions respectively, namely adding a corrective count to counter A at condition $C_1 \times C_2 \times C_3$.

Gate G3 in FIGURE 3 has the function of inhibiting any pulse into counter A during the first cycle of S1. There is no physical equivalent of gate G3 in FIGURE 2, and there is no need for it since the first $\tau_r$ cannot occur until $1.3\tau_1$ after $\tau_t$. FIGURE 3 shows an embodiment of the invention where the circuitry utilized could not insure the absence of a carry pulse on line 37 during the first cycle without the delay D2 and gate G3 combination. D2 represents about 95 ns. delay in the embodiment.

Delay D of FIGURE 2 cannot be identified in FIGURE 3, but D1 is selected such, that D1, D2, D3 and D4 delays in combination with the unavoidable circuit delays of 0–1, 0–2, G1, G2, G4, G6, I, FF1 and FF2 assure the same composite relative delay between S2, S1, S1′ and S1″ as hereinbefore specified in connection with FIGURE 1.

It is apparent from the foregoing that logic network 14 and FIGURE 2, though logically different, functionally are equivalent since both perform the same logic function Both are merely representative of the block diagram which can be utilized to perform the present method.

In addition, it should be noted that flip-flop FF or FF5 are merely representative of a temporary storage element. Any suitable bistable device can be utilized. In addition, if desired, a monostable circuit can be substituted for the bistable circuit. This eliminates the need for periodically resetting the bistable device by the S1″ signal. With such an arrangement, it is only necessary to modify the gates 1 and 2 of FIGURE 2 or gate G1 of FIGURE 3, so as to lock the monostable circuit in its quasi-stable state and arranging gates G4 and G5 of FIGURE 3 to unlock it from the quasi-stable state.

In a typical embodiment of FIGURE 3, the start oscillator 0–1 is operating at a frequency of 10 mc. and the offset frequency produced by the stop oscillator 0–2 is close to 10.1 mc. With such frequencies, the main counter A advances one count for every $\tau_1 = 100$ ns. and every count of interpolating counter B will represent $\tau_2 = 1$ nanosecond interpolating time.

For purposes of illustration also applicable to FIGURE 1, let it be assumed that the time interval to be measured is 635 ns. The main counter A i sadvanced one count at the zero phase of the signal S1″, therefore, most likely, it will accumulate 5 counts until stop time $\tau_p$ and FF5, as the $S3(t)$ wave form on FIGURE 1, will stop in its set state. Since the phase locked stop oscillator 0–2 is initially 35 ns. behind the zero phase of signal S1 it will requre 35 cycles of 100 ns. each to elapse before coincidence is arrived at in gate G7 since the period of the stop oscillator is only 1 ns. shorter than the period of the start oscillator 0–1. When G7 senses coincidence by triggering FF4 it stops the interpolating counter B on number 35. Since this number is less than 80, at the time $\tau_c$ FF5 gets a reset pulse, and changes counter A count storage from 5 to 6. Thus the last three DCU's of the instrument will display 6, 3 and 5 respectively, correctly showing the time measured as 635 ns.

With the same inputs, but with a relatively early $\tau_r$ within the specified tolerances, FF5 may already be in a reset condition the 6th time at time $\tau_p$. That means, counter A accumulated 6 counts so far. Counter B will operate exactly as before, and because $35 < 80$, at $\tau_c$ time, FF5 will receive a reset pulse. Nothing can happen though, since FF5 is already reset. The main count number therefore will not change, and the display, as before, will indicate 635 ns.

In the foregoing embodiments it was assumed, that start oscillator 0–1 is a phase locked oscillator. Since oscillator 0–1 is generating coarse time quanta $\tau_1$, for accurate measurement of long time intervals it is necessary for 0–1 to have geed long term stability. Copending application Ser. No. 377,825, filed June 25, 1964, describes such an oscillator which is also phase locked. But usually such stable oscillators are not phase locked. In that case, time interval T should be determined as $T = T' + T''$ where $T' = N_3\tau_2$ is the time interval from start time $\tau_t$ to the time of the first clock pulse $\tau_o$ and T″ is the rest of the time interval from $\tau_o$ to $\tau_p$. $T'' = N_1\tau_1 + N_2\tau_2$ can be measured with the method hereinbefore described, since start of T″ is phase locked by definition to the nonphase locked oscillator 0–1. On the other hand T′ is a time interval which has its stop time phase locked to the output of 0–1. It can be readily seen, that a start oscillator 0–3 started in phase with $\tau_t$ together with non phase locked 0–1 can perform an interpolation function thereby determing $N_3$. Since the "stop" oscillator for T′ is 0–1, and its frequency is fixed at $f_1$, we can select $f_3 = f_1 - \Delta f$ instead, to preserve the necessary frequency difference between the start and stop oscillators. After $N_3$ is determined, the sum of $N_2 + N_3$ can be obtained by known digital techniques, and bis displaling $N_1$ and $N_2 + N_3$ the measurement of T is completed.

It is apparent from the foregoing that a new and improved logic network and method has been disclosed which is particularly adapted for use in interpolating time interval counters. In addition the method can be utilized for retroactive error correction for retroactively determining quasicoincident relative time relationships. Furthermore, the logic network and method is adaptable to both phase lock and non phase locked reference oscillators.

I claim:

1. In a logic network for use in an interpolating time interval counter, a first generator commencing operation on a first command and supplying a first cyclic signal, a second generator commencing operation upon receipt of a second command and supplying a second cyclic signal, temporary storage means capable of assuming first and second conditions, means for supplying signals from said first generator to said temporary storage to cause said temporary storage to be triggered alternately into each of said conditions as the first signal advances, coarse counting the number of times the temporary storage is triggered means connected to the temporary storage for determining into said second condition, interpolating counting means for counting the number of cycles in the second signal, and means connected to the interpolating counting means and to the temporary storage for interrogating the temporary storage to determine whether or not an additional count should be supplied to the coarse counting means after termination of the second signal.

2. A logic network as in claim 1 wherein the signal from the first generator has a fixed phase relationship with respect to one of said commands.

3. In a method for determing the precise time relationship, temporarily electrically storing information about the coarse time relationship, electronically obtaining and storing a number representing the fine time relationship after the coarse time relationship has been determined, using said information and said stored number representing the fine time relationship for retroactively deciding whether the information about the coarse time relationship is correct and causing, if necessary, either a new determination of the coarse time relationship or a correction of said information.

4. In a method for determining a physical quantity in coarse and vernier quanta, electronically obtaining and storing the number of coarse quanta in the physical quantity within an error limit of 0 and 1, electronically obtaining and storing the number of vernier quanta after the number of coarse quanta has been determined, utilizing the number of vernier quanta to electrically decide whether the number or coarse quanta should be changed by one and causing a correction of the number of coarse quanta if logically necessary.

5. In a device for quantizing a physical quantity in coarse and vernier quanta, means for obtaining and storing the number of coarse quanta in the physical quantity within the error limit of 0 and −1, means for obtaining and storing the number of vernier quanta after the number of coarse quanta have been obtained, and means connected to the means for storing the number of vernier quanta for retroactively determining whether the number of coarse quanta is correct and whether +1 should be added to the number of coarse quanta, said last named means including a bistable device for conditionally storing one of the coarse quanta and gate means connected to the bistable device for interrogating the bistable device to determine which condition it is in.

6. In a logic network for use in an interpolating time interval counter for avoiding the possible ambiguity when one of the boundaries of the time interval is near the advancing time of the coarse counter advanced by a coarse clock signal generator, means for conditionally storing one of the coarse clock signals, and means for determining whether or not a coarse clock signal stored in the temporary storage should be counted, said means for conditionally storing the coarse clock signal consisting of a bistable device having two stable states, and means connected to the generator of the coarse clock signal for supplying two signals to the bistable device, one of the signals being delayed in phase with respect to the coarse clock signal and the other of the signals being advanced in phase with respect to the coarse clock signal.

7. In an apparatus for quantizing a physical quantity in coarse and vernier quanta, first electronic circuit means for obtaining and storing a coarse quantum number representing within a maximum error of one the number of coarse quanta in the physical quantity being quantized, second electronic circuit means for obtaining and storing a vernier quantum number after the coarse quantum number has been stored, said vernier quantum number representing the number of vernier quanta in the physical quantity over the nearest number of coarse quanta not exceeding said physical quantity, circuit means connected to the second electronic circuit means for changing the stored number of coarse quanta by one in case the physical quantity being measured is close to an integer times the coarse quantum and in case the vernier quantum number is within predetermined limits.

8. In an appaartus for quantizing a physical quantity as a sum of coarse and vernier quanta, first electronic circuit means for obtaining and storing a coarse quantum number representing within a maximum error of one the number of coarse quanta in the physical quantity being quantized, second electronic circuit means for recognizing and memorizing the approximate relative relationship between the physical quantity and the nearest full coarse quantum, third electronic circuit means for obtaining and storing a vernier quantum number representing the number of fine quanta in said physical quantity after the number of coarse quanta have been obtained and stored, logic circuit means for correlating the memorized approximate relationship with the stored vernier quantum number and means interconnecting said first electronic circuit means and said logic circuit means for correcting the stored number of coarse quanta by one in response to a signal from said logic circuit means.

9. In an apparatus for measuring the magnitude of a physical quantity in coarse and fine quanta, first electronic counting means for obtaining and storing the number of coarse quanta within a possible error of one count, second electronic counting means for obtaining and storing the number of fine quanta, electronic memory means for storing information representing the possibility of the one count error in the number of coarse quanta, logic circuit means connected to said second electronic counting means and said electronic memory means for correlating the stored information and the stored number of fine quanta to indicate by an output signal of the stored number of coarse quanta should be corrected and means connected to said logic circuit means for changing the stored number of coarse quanta by one.

10. In a logic network for an interpolating time interval counter having coarse and vernier counters accumulating coarse and vernier counts, memory means for indicating by an output signal if the end of the time interval occurs in a predetermined range of time relationship to the advancing time of the coarse counter, circuit means connected to the vernier counter for indicating by an additional output signal that the accumulated vernier count is within predetermined limits and logic means connected to said memory means and to said circuit means for causing on command a retroactive correction in the previously accumulated coarse count in response to the simultaneous presence of said first named and additional output signals.

11. A logic network as in claim 10 wherein said memory means is a bistable circuit and said logic means is an AND gate.

12. In an apparatus for quantizing a physical quantity in coarse and vernier quanta, first electronic digital circuit means for obtaining and storing a coarse quantum number representing within a maximum error of one of the number of coarse quanta in the physical quantity being quantized, electronic memory means for recognizing, memorizing and indicating by first output signal of the physical quantity is near an integer times the coarse quantum, second electronic digital circuit means for obtaining and storing a vernier quantum number after the coarse quantum number has been stored, said vernier quantum number representing the number of vernier quanta in the physical quantity over the nearest number of coarse quanta not exceeding said physical quantity, electronic circuit means connected to the second electronic digital circuit means for generating a second output signal if the venier quantum number is within predetermined limits, logic circuit means connected to said electronic memory means and to said electronic circuit means and receiving said first and second output signals if present, said logic circuit means generating a third output signal in case said first and second output signals are simultaneously present, and connecting means feeding said third output signal to said first electronic digital circuit means thereby causing said stored number of coarse quanta to be changed by one.

13. In an apparatus for quantizing a physical quantity in coarse and vernier quanta, first electronic circuit means for obtaining and storing a coarse quantum number representing within a maximum error of one the number of coarse quanta in the physical quantity being quantized, electronic memory means for recognizing and memorizing by assuming a set condition if the physical quantity is near an integer times the coarse quantum, second electronic circuit means for obtaining and storing a vernier quantum number after the coarse quantum number has been stored, said vernier quantum number representing the number of vernier quanta in the physical quantity over the nearest number of coarse quanta not exceeding said physical quantity, electronic circuit means connected to the second electronic digital circuit means for generating on command an output signal if the vernier quantum number is within predetermined limits, additional circuit means connecting said electronic circuit means to said electronic memory means and supplying said output signal thereto, causing the generation of a second signal in case said memory means is in said set condition and causing said stored number of coarse quanta to be changed by one in response to said second signal.

14. In a logic network for use in interpolating time interval quantizers of the type having coarse and vernier counting means for obtaining and storing the number of coarse and vernier time quanta respectively in the time interval as the physical quantity to be quantized, storage means having a quiescent and a storing condition, said storage means assuming said storing condition if the physical quantity is found to be near an integer times the coarse quanta, and logic circuit means connected to said storage means, said logic circuit means having an input for receiving a signal from said means for storing the number of vernier quanta, said logic means causing the stored number of coarse quanta to be increased by one if the storage means is in the storing condition and simultaneously the stored number of vernier quanta is under a predetermined limit.

References Cited

UNITED STATES PATENTS

| | | | |
|---|---|---|---|
| 2,738,461 | 3/1956 | Burbeck et al. | 324—68 |
| 3,218,553 | 11/1965 | Peterson et al. | 324—68 |
| 3,191,010 | 6/1965 | Tripp et al. | 340—347 X |
| 3,255,447 | 6/1966 | Sharples | 340—347 |

OTHER REFERENCES

Baron: The Vernier Time Measuring Technique, Proceedings of the IRE, January 1957, pp. 21–29.

RUDOLPH V. ROLINIC, *Primary Examiner.*

P. F. WILLE, *Assistant Examiner.*

U.S. Cl. X.R.

328—129; 340—347